J. McCOUN.
Milk Rack and Table.
No. 61,675.
Patented Jan. 29, 1867.
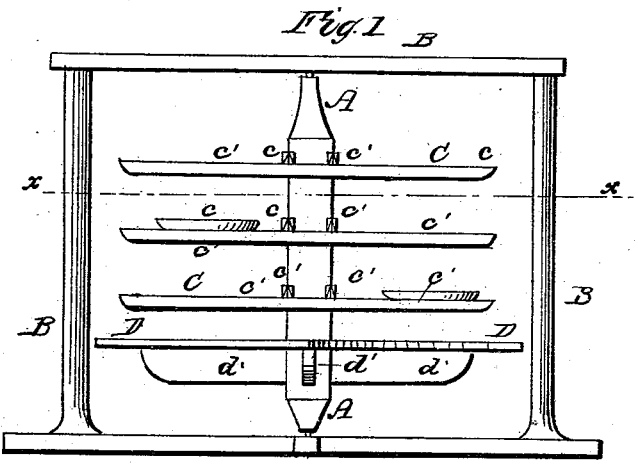
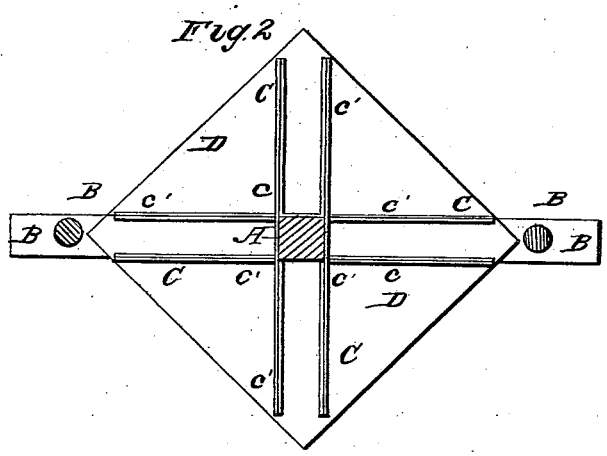
Witnesses
F. A. Jackson
Theo Tusch
Inventor
Jno McCoun
Per Munn & Co
Atty

United States Patent Office.

JOHN McCOUN, OF LOCKPORT, NEW YORK.

Letters Patent No. 61,675, dated January 29, 1867.

---

IMPROVEMENT IN MILK RACK AND TABLE COMBINED.

---

*The Schedule referred to in these Letters Patent and making part of the same.*

---

TO ALL WHOM IT MAY CONCERN:

Be it known that I, JOHN McCOUN, of Lockport, in the county of Niagara, and State of New York, have invented a new and improved Milk Rack and Table; and I do hereby declare that the following is a full, clear, and exact description thereof, which will enable others skilled in the art to make and use the same, reference being had to the accompanying drawings, forming a part of this specification, in which—

Figure 1 is a side view of my improved milk rack and table.

Figure 2 is a horizontal section of the same, taken through the line $x\ x$, fig. 1.

Similar letters of reference indicate like parts.

My invention consists in a combined revolving milk rack and table so constructed, as hereinafter more fully described, that the air may have a free circulation all around the milk pans, cooling the milk more quickly, and producing more cream and better butter than when the milk is kept in the ordinary manner.

A is a vertical shaft, the ends of which are pivoted to the floor and ceiling of the milk room, or to the horizontal timbers of the frame B, erected for that purpose. In the latter case the lower part of the frame B must be sufficiently broad to furnish a stable foundation for the table and rack. The rack C is formed by attaching slats $c'$ to the vertical shaft A. The slats $c'$ are attached to the shaft A in pairs, one on each side of the said shaft, so that their projecting ends may form shelves for the support of the milk pans, as shown in the drawings. The number of these slats, and the distance to which they project beyond the shaft A, will depend upon the quantity of milk to be provided for, and the extent of the place in which it is to be set or erected. The size of the revolving shaft A must be such that the slats $c'$, attached to its opposite sides, may be so near together as to both come under the bottom of the pan and support it. A convenient length for the slats $c'$, under ordinary circumstances, is for them to extend so far that each pair of slats may support four pans, two on each side of the shaft A. D is the table, the leaves or top of which rest upon and are supported by radial arms, $d'$, extending out from the shaft A, as shown in fig. 1. The top of the table D may be square, round, or of any other convenient or desired form; and its size should correspond to that of the rack C. The pans may be set upon the table D to be filled with milk preparatory to placing them upon the rack. It is also very convenient to set the pans upon it for skimming off the cream, or for any other of the numerous uses for which a table is required in a dairy room. By this arrangement, also, the required pans may be revolved to the position occupied by the operator, thus avoiding the laborious carrying of the full pans, which is unavoidable when the pans are set on shelves in the ordinary manner.

Having thus described my invention, I claim as new, and desire to secure by Letters Patent—

A combined revolving milk rack and table, substantially as herein shown and described.

The above specification of my invention signed by me this 24th day of August, 1866.

JOHN McCOUN.

Witnesses:
E. SHEPARD,
JOHN TUBBS.